(12) United States Patent
Worthen

(10) Patent No.: US 7,346,656 B2
(45) Date of Patent: Mar. 18, 2008

(54) ASYNCHRONOUS, NETWORKED PUBLICATION AND COLLABORATIVE COMMUNICATION SYSTEM

(75) Inventor: Bill C. Worthen, Minnetonka, MN (US)

(73) Assignee: Unity Works Media, Edina, MN (US)

( * ) Notice: Subject to any disclaimer, the term of this patent is extended or adjusted under 35 U.S.C. 154(b) by 762 days.

(21) Appl. No.: 10/272,517

(22) Filed: Oct. 15, 2002

(65) Prior Publication Data

US 2003/0149725 A1 Aug. 7, 2003

Related U.S. Application Data

(60) Provisional application No. 60/329,630, filed on Oct. 15, 2001.

(51) Int. Cl.
*G06F 15/16* (2006.01)

(52) U.S. Cl. ........................................ 709/204; 709/217

(58) Field of Classification Search ................... 705/26, 705/14, 1–5; 709/203, 204, 200–202, 217–227, 709/208, 213; 715/760, 513; 700/94; 369/1, 369/2, 6, 11

See application file for complete search history.

(56) References Cited

U.S. PATENT DOCUMENTS

| | | | |
|---|---|---|---|
| 5,263,869 A | 11/1993 | Ziv-El | |
| 5,793,365 A | 8/1998 | Tang et al. | |
| 5,862,346 A | 1/1999 | Kley et al. | |
| 5,878,214 A | 3/1999 | Gilliam et al. | |
| 5,956,491 A | 9/1999 | Marks | |
| 5,974,446 A | 10/1999 | Sonnenreich et al. | |
| 6,088,702 A * | 7/2000 | Plantz et al. | ............. 707/103 R |
| 6,119,147 A | 9/2000 | Toomey et al. | |
| 6,223,165 B1 | 4/2001 | Lauffer | |
| 6,643,663 B1 * | 11/2003 | Dabney et al. | ............. 707/102 |
| 6,701,343 B1 * | 3/2004 | Kenyon | ....................... 709/204 |
| 2001/0029501 A1 | 10/2001 | Yokobori et al. | |
| 2001/0056469 A1 | 12/2001 | Oonuki | |
| 2002/0023018 A1 | 2/2002 | Kleinbaum | |
| 2002/0029179 A1 * | 3/2002 | Gruber et al. | ................ 705/35 |
| 2002/0038299 A1 * | 3/2002 | Zernik et al. | ................... 707/3 |
| 2002/0073026 A1 * | 6/2002 | Gruber et al. | ................ 705/39 |
| 2002/0077839 A1 | 6/2002 | Siegel et al. | |
| 2002/0091538 A1 * | 7/2002 | Schwartz et al. | ............. 705/1 |
| 2002/0091725 A1 | 7/2002 | Skok | |
| 2002/0099654 A1 * | 7/2002 | Nair | .......................... 705/40 |
| 2005/0240433 A1 * | 10/2005 | Schwartz et al. | ............. 705/1 |

OTHER PUBLICATIONS

Kim, Amy Jo; "Community Building on the Web"; 2000; Peachpit Press; Chapters 1 and 2.*
Website Print-Out: Intranet News, http://www.intranetjournal.com, 3 pgs.; Sep. 2002.

* cited by examiner

*Primary Examiner*—Moustafa Meky
(74) *Attorney, Agent, or Firm*—Patterson, Thuente, Skaar & Christense, P.A.

(57) ABSTRACT

Asynchronous, networked publication and collaborative communication system and method comprise a secure website managed by one organization to which authorized members of a team can connect using an Internet browser program. News content is developed on the website using selected webpage templates, which news content is then published to pre-established end points sponsored by another organization and broadcast to selected persons. Alternatively the news content can be developed within the sponsoring organization when at least one authorized member is not affiliated with the sponsoring organization. Preferably, at least one is connected to a database to archive news content.

28 Claims, 9 Drawing Sheets

FIG. 12
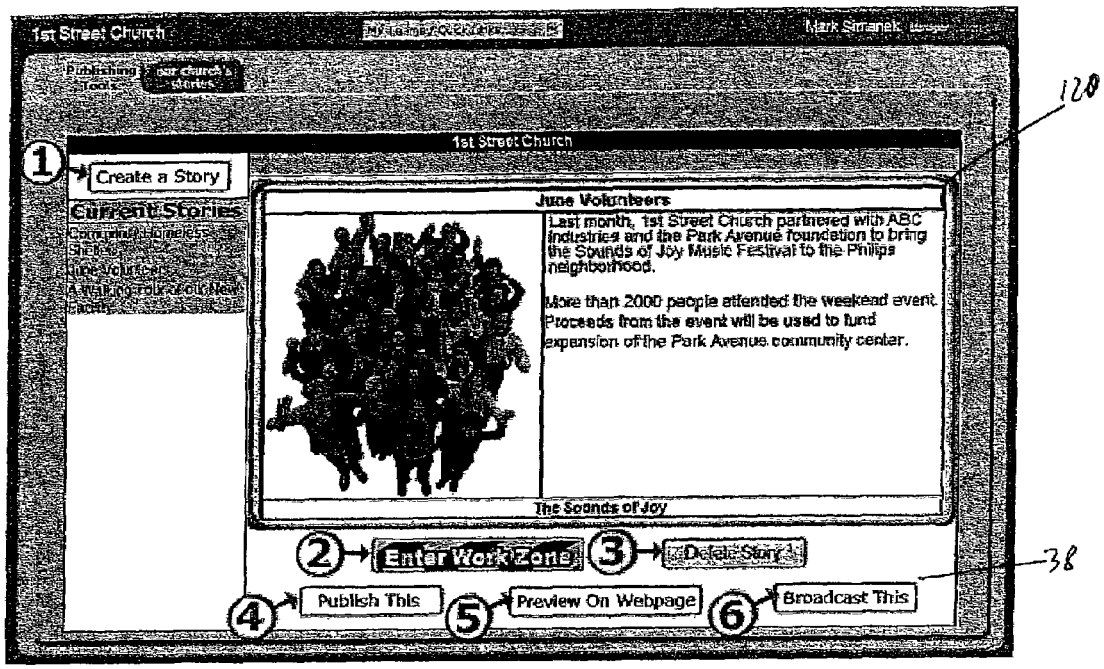
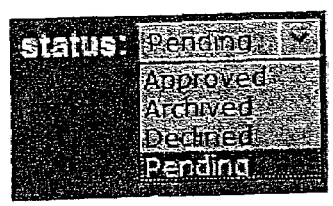
FIG. 14A
FIG. 14B
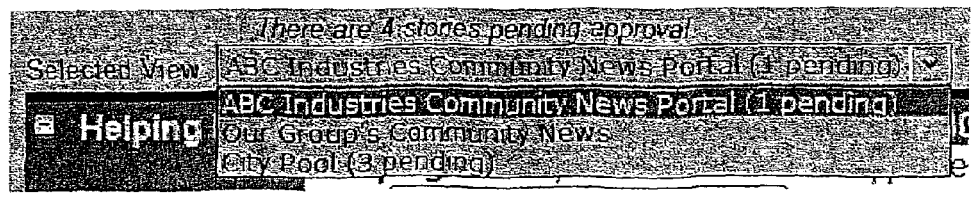

ASYNCHRONOUS, NETWORKED PUBLICATION AND COLLABORATIVE COMMUNICATION SYSTEM

RELATED APPLICATIONS

This application claims the benefit of U.S. Provisional Application No. 60/329,630, filed on Oct. 15, 2001, hereby incorporated herein in its entirety by reference. This application is also related to the co-pending patent application entitled *Asynchronous, Leader Facilitated, Collaborative Networked Communication System*, filed on Oct. 15, 2002 and assigned to the assignee of the present invention.

COMPACT DISC

A compact disc containing codes and information describing a preferred embodiment of the present invention is submitted herewith and is hereby incorporated by reference. The compact disc contains the following files and/or programs:

| Title | Size in Bytes | Date of Creation |
|---|---|---|
| UnityworksSource.txt | 15,977 | Oct. 14, 2002 |
| D:\UWSource | | |
| UnityWorks_Database.sql | 205,915 | Oct. 14, 2002 |
| UnityworksSource.txt | 15,977 | Oct. 14, 2002 |
| D:\UWSource\Components | 0 bytes | |
| D:\UWSource\Components\Business | | |
| BroadcastList.cls | 6,410 | Sep. 19, 2002 |
| BroadcastLists.cls | 3,033 | Sep. 19, 2002 |
| CContent.cls | 19,041 | Oct. 1, 2002 |
| CContentList.cls | 11,369 | May 23, 2002 |
| CContentPool.cls | 22,470 | Sep. 20, 2002 |
| CMRA.cls | 21,546 | Sep. 19, 2002 |
| CNotes.cls | 3,817 | Sep. 19, 2002 |
| Contact.cls | 11,003 | Sep. 19, 2002 |
| Context.bas | 5,246 | Sep. 20, 2002 |
| CSession.cls | 3,688 | Oct. 1, 2002 |
| CSlideSet.cls | 34,739 | Oct. 8, 2002 |
| CSlideSetList.cls | 12,776 | Sep. 19, 2002 |
| CVisitor.cls | 6,673 | Jan. 15, 2002 |
| DB.bas | 6,568 | Sep. 19, 2002 |
| Encryption.bas | 2,644 | Dec. 7, 2001 |
| ErrorCodes.bas | 22,851 | Jul. 16, 2002 |
| Event.cls | 26,385 | Oct. 1, 2002 |
| Events.cls | 4,822 | Sep. 19, 2002 |
| FileSystem.bas | 2,085 | Aug. 1, 2002 |
| Format.bas | 10,640 | Sep. 19, 2002 |
| Group1.vbg | 166 | Dec. 21, 2001 |
| IContent.cls | 1,485 | Apr. 27, 2002 |
| Link.cls | 6,284 | Dec. 20, 2001 |
| Links.cls | 4,376 | Dec. 20, 2001 |
| Location.cls | 15,182 | Sep. 19, 2002 |
| Locations.cls | 3,570 | Sep. 19, 2002 |
| Mapping.bas | 5,963 | Sep. 19, 2002 |
| Member.cls | 25,175 | Oct. 14, 2002 |
| Members.cls | 4,174 | Sep. 19, 2002 |
| Membership.cls | 24,874 | Oct. 14, 2002 |
| Memberships.cls | 5,120 | Sep. 19, 2002 |
| Message.cls | 26,297 | Oct. 01, 2002 |
| Messages.cls | 4,482 | Sep. 19, 2002 |
| mssccprj.scc | 164 | Oct. 11, 2002 |
| Page.cls | 9,010 | Dec. 7, 2001 |
| Pages.cls | 4,179 | Dec. 7, 2001 |
| PublishQueue.cls | 6,801 | Jul. 16, 2002 |
| Reminder.cls | 9,078 | Sep. 19, 2002 |
| Reminders.cls | 4,853 | Sep. 19, 2002 |
| SessionState.cls | 902 | Jun. 12, 2002 |
| Team.cls | 40,265 | Sep. 20, 2002 |
| Teams.cls | 4,105 | Sep. 19, 2002 |
| Unity_Business.dll | 372,736 | Oct. 11, 2002 |
| Unity_Business.vbp | 3,384 | Oct. 11, 2002 |
| Validation.bas | 4,564 | Sep. 19, 2002 |
| D:\UWSource\Components\DB | | |
| CCache.cls | 6,166 | Jan. 31, 2002 |
| CDB_XML.cls | 25,336 | Sep. 26, 2002 |
| CDBIO.cls | 67,009 | Oct. 11, 2002 |
| Context.bas | 5,246 | Sep. 20, 2002 |
| DB.bas | 6,568 | Sep. 19, 2002 |
| Format.bas | 10,640 | Sep. 19, 2002 |
| Group1.vbg | 160 | Jan. 16, 2002 |
| mssccprj.scc | 152 | Oct. 11, 2002 |
| Project1.vbp | 698 | Dec. 11, 2001 |
| Project1.vbw | 28 | Dec. 11, 2001 |
| Unity_DB.dll | 131,072 | Oct. 11, 2002 |
| Unity_DB.vbp | 1,798 | Oct. 11, 2002 |
| D:\UWSource\Components\Strings | | |
| CErrorMessages.cls | 2,804 | Dec. 7, 2001 |
| Context.bas | 5,246 | Sep. 20, 2002 |
| ErrorCodes.bas | 22,851 | Jul. 16, 2002 |
| Group1.vbg | 149 | Dec. 20, 2001 |
| mssccprj.scc | 159 | Oct. 11, 2002 |
| Strings_English.bas | 20,920 | Sep. 19, 2002 |
| Unity_Strings.dll | 36,864 | Oct. 3, 2002 |
| Unity_Strings.vbp | 1,187 | Oct. 3, 2002 |
| D:\UWSource\Components\Utils | | |
| CBase29.cls | 1,748 | Dec. 19, 2001 |
| CBase34.cls | 1,277 | Dec. 7, 2001 |
| CBase36.cls | 1,277 | Dec. 7, 2001 |
| CBase62.cls | 1,301 | Dec. 7, 2001 |
| CCollection.cls | 2,202 | Dec. 7, 2001 |
| CEncrypt.cls | 9,355 | Dec. 7, 2001 |
| CErrorMessages.cls | 2,804 | Jan. 21, 2002 |
| Context.bas | 5,246 | Sep. 20, 2002 |
| CRegistryTool.cls | 10,819 | Dec. 7, 2001 |
| CStringBuilder.cls | 13,753 | Mar. 18, 2002 |
| CTimer.cls | 1,473 | Dec. 7, 2001 |
| ErrorCodes.bas | 22,860 | Jan. 21, 2002 |
| mssccprj.scc | 276 | Oct. 11, 2002 |
| Strings_English.bas | 20,608 | Jan. 21, 2002 |
| Unity_Strings.vbp | 1,324 | Apr. 8, 2002 |
| Unity_Strings.vbw | 102 | Mar. 6, 2002 |
| Unity_Utils.dll | 45,056 | Oct. 9, 2002 |
| Unity_Utils.vbp | 1,503 | Oct. 9, 2002 |
| D:\UWSource\Components\Web2002_03_11 | | |
| CSlideViewer.cls | 74,409 | Mar. 11, 2002 |
| Broadcast.cls | 27,572 | Oct. 8, 2002 |
| BroadcastListDetail.cls | 23,841 | Oct. 4, 2002 |
| CallStack.bas | 2,616 | Apr. 5, 2002 |
| CallState.bas | 52 | Jun. 12, 2002 |
| CareCast.cls | 6,788 | Jul. 16, 2002 |
| CCallState.cls | 26,962 | Oct. 8, 2002 |
| CCustomerService.cls | 9,228 | Oct. 11, 2002 |
| CImage.cls | 6,617 | Jan. 7, 2002 |
| CListView.cls | 51,608 | Oct. 11, 2002 |
| CMRAForm.cls | 35,140 | Oct. 4, 2002 |
| CNotes.cls | 3,405 | Mar. 28, 2002 |
| Configuration.cls | 33,007 | Oct. 4, 2002 |
| ContentSubmission.cls | 12,101 | Jan. 3, 2002 |
| Context.bas | 5,246 | Sep. 20, 2002 |
| CSlideViewer.cls | 146,574 | Oct. 11, 2002 |
| CView.cls | 29,319 | Oct. 8, 2002 |
| CViewContainer.cls | 18,333 | Oct. 4, 2002 |
| CViews.cls | 1,623 | Sep. 19, 2002 |
| EditorTool.cls | 36,059 | Oct. 8, 2002 |
| Email.bas | 24,467 | Sep. 19, 2002 |
| Encryption.bas | 2,644 | Dec. 7, 2001 |
| ErrorCodes.bas | 22,851 | Jul. 16, 2002 |
| EventCalendar.cls | 24,302 | Oct. 4, 2002 |
| EventDetail.cls | 31,286 | Oct. 4, 2002 |
| FileSystem.bas | 2,085 | Aug. 1, 2002 |
| Folder.cls | 25,161 | Sep. 19, 2002 |

-continued

| Title | Size in Bytes | Date of Creation |
|---|---|---|
| Format.bas | 10,640 | Sep. 19, 2002 |
| HTMLFunctions.bas | 61,967 | Oct. 9, 2002 |
| InvitationTool.cls | 11,037 | Sep. 26, 2002 |
| IWebComponent.cls | 1,138 | Feb. 21, 2002 |
| KO_Ministry.cls | 4,199 | May 10, 2002 |
| KO_Portfolio.cls | 7,083 | Aug. 1, 2002 |
| LocationDetail.cls | 382 | Dec. 19, 2001 |
| MasterView.cls | 21,595 | Sep. 19, 2002 |
| MembershipDetail.cls | 55,892 | Oct. 14, 2002 |
| MessageBoard.cls | 53,634 | Oct. 4, 2002 |
| MessageDetail.cls | 93,667 | Oct. 14, 2002 |
| mssccprj.scc | 154 | Oct. 11, 2002 |
| Notification.cls | 378 | Dec. 19, 2001 |
| Page.cls | 19,161 | Oct. 11, 2002 |
| PasswordRecovery.cls | 11,211 | Sep. 26, 2002 |
| Publish.cls | 19,624 | Oct. 4, 2002 |
| Publisher.cls | 7,916 | Jun. 18, 2002 |
| Roster.cls | 19,735 | Sep. 26, 2002 |
| Rotator.cls | 3,482 | Dec. 19, 2001 |
| Search.cls | 11,571 | Sep. 19, 2002 |
| Security.cls | 8,415 | Aug. 1, 2002 |
| SubmissionDetail.cls | 5,730 | Dec. 19, 2001 |
| TeamDetail.cls | 25,358 | Sep. 26, 2002 |
| TeamHeader.cls | 16,414 | Sep. 19, 2002 |
| TemplateSelector.cls | 11,073 | Oct. 4, 2002 |
| Unity_Web.dll | 962,560 | Oct. 11, 2002 |
| Unity_Web.vbp | 4,704 | Oct. 14, 2002 |
| UnityConstants.bas | 508 | Feb. 21, 2002 |
| UnityWorksTemplate.bas | 478 | Dec. 19, 2001 |
| UserHTML.cls | 9,312 | Aug. 1, 2002 |
| VerticalNav.cls | 16,732 | Sep. 26, 2002 |
| Video.cls | 7,119 | May 10, 2002 |
| WebComponents.cls | 3,580 | Dec. 19, 2001 |
| WebModuleWrapper.cls | 9,714 | Sep. 26, 2002 |
| D:\UWSource\Website | | |
| _Inc_Common.asp | 5,663 | Aug. 7, 2002 |
| _Inc_FlowControl.asp | 431 | Aug. 2, 2002 |
| about.asp | 383 | Aug. 2, 2002 |
| commonFunctions.asp | 1,028 | Aug. 2, 2002 |
| contact.asp | 457 | Aug. 2, 2002 |
| default.asp | 15,973 | Oct. 11, 2002 |
| default.css | 12,496 | Aug. 26, 2002 |
| desktop.ini | 114 | Feb. 25, 2000 |
| empty.htm | 279 | Aug. 2, 2002 |
| help.htm | 575 | Aug. 2, 2002 |
| intro.asp | 1,262 | Aug. 2, 2002 |
| jesus.asp | 1,682 | Aug. 2, 2002 |
| pageHeaders.asp | 450 | Aug. 2, 2002 |
| PicView.asp | 560 | Aug. 2, 2002 |
| press.asp | 353 | Aug. 2, 2002 |
| privacy.asp | 381 | Aug. 2, 2002 |
| services.asp | 384 | Aug. 2, 2002 |
| team_legal.htm | 3,704 | Aug. 2, 2002 |
| tempoffline.asp | 343 | Aug. 2, 2002 |
| terms.asp | 8,253 | Oct. 8, 2002 |
| visitorAdd.asp | 5,044 | Aug. 2, 2002 |
| visitorAdopt.asp | 3,473 | Aug. 2, 2002 |
| visitorList.asp | 2,880 | Aug. 2, 2002 |
| vssver.scc | 80 | Aug. 26, 2002 |
| WebListView.asp | 8,956 | Oct. 8, 2002 |
| WebListView.htm | 861 | Oct. 7, 2002 |
| WebPreview.asp | 8,281 | Aug. 19, 2002 |
| WebPreview.htm | 638 | Aug. 27, 2002 |
| welcome.htm | 985 | Aug. 2, 2002 |
| D:\UWSource\Website\_private | | |
| charity.xml | 2,174 | Aug. 20, 2002 |
| community.xml | 1,515 | Oct. 8, 2002 |
| config_Ministry.xml | 2,110 | Jul. 8, 2002 |
| config_ministry_newsOnly.xml | 1,202 | Oct. 8, 2002 |
| config_WorkGroup.xml | 2,817 | Jul. 8, 2002 |
| contentEditor.xml | 1,463 | Oct. 8, 2002 |
| CustServ.xml | 3,312 | Sep. 17, 2002 |
| propertyManager.xml | 892 | Jul. 8, 2002 |
| sales.xml | 1,200 | Jul. 8, 2002 |
| SeniorPastor.xml | 2,204 | Oct. 8, 2002 |
| support.xml | 1,253 | Oct. 8, 2002 |
| unityTeam.xml | 2,562 | Jul. 31, 2002 |
| workGroup.xml | 6,248 | Sep. 10, 2002 |
| D:\UWSource\Website\CustServ | | |
| _Inc_MRACommon.asp | 1,367 | Jul. 10, 2002 |
| CSMain.asp | 1,246 | Jul. 10, 2002 |
| MRACheckIn.asp | 2,087 | Jul. 10, 2002 |
| MRADetail.asp | 5,698 | Sep. 10, 2002 |
| MRAInstall.asp | 2,889 | Sep. 10, 2002 |
| MRAQueue.asp | 4,068 | Sep. 10, 2002 |
| D:\UWSource\Website\images | | |
| ball_sage.gif | 113 | Jun. 11, 2002 |
| bold.gif | 82 | Oct. 8, 2002 |
| btnAction_01.gif | 718 | Aug. 22, 2002 |
| btnAction_02.gif | 173 | Aug. 22, 2002 |
| btnAction_03.gif | 115 | Aug. 22, 2002 |
| btnAction_04.gif | 1,675 | Aug. 22, 2002 |
| btnAction_05.gif | 159 | Aug. 22, 2002 |
| btnActionHi_01.gif | 700 | Aug. 28, 2002 |
| btnActionHi_02.gif | 147 | Aug. 28, 2002 |
| btnActionHi_03.gif | 114 | Aug. 28, 2002 |
| btnActionHi_04.gif | 1,766 | Aug. 28, 2002 |
| btnActionHi_05.gif | 143 | Aug. 28, 2002 |
| bulletList.gif | 85 | Oct. 8, 2002 |
| cannon_sm.gif | 1,279 | Oct. 8, 2002 |
| cannon_x-sm.gif | 356 | Aug. 28, 2002 |
| CareCast_logo.gif | 5,029 | Oct. 8, 2002 |
| center.gif | 73 | Oct. 8, 2002 |
| cleardot.gif | 42 | Oct. 8, 2002 |
| ConTemp1.bmp | 36,214 | Apr. 29, 2002 |
| ConTemp1.JPG | 4,344 | Apr. 29, 2002 |
| ConTemp2.jpg | 36,214 | Apr. 29, 2002 |
| ConTemp3.jpg | 6,324 | Apr. 29, 2002 |
| ConTemp4.JPG | 3,238 | Apr. 29, 2002 |
| CornerBeigeLeft.gif | 864 | Oct. 8, 2002 |
| CornerBeigeRight.gif | 864 | Oct. 8, 2002 |
| CornerWhiteLeft.gif | 866 | Oct. 8, 2002 |
| CornerWhiteLeftOn.gif | 865 | Oct. 8, 2002 |
| CornerWhiteRight.gif | 864 | Oct. 8, 2002 |
| CornerWhiteRightOn.gif | 864 | Oct. 8, 2002 |
| edit.gif | 866 | Oct. 8, 2002 |
| filmstrip_btm.gif | 899 | Oct. 8, 2002 |
| filmstrip_top.gif | 879 | Oct. 8, 2002 |
| fraCaption_01.gif | 947 | Sep. 6, 2002 |
| fraCaption_02.gif | 728 | Sep. 6, 2002 |
| fraCaption_03.gif | 949 | Sep. 6, 2002 |
| fraCaption_04.gif | 134 | Sep. 6, 2002 |
| fraCaption_05.gif | 294 | Sep. 6, 2002 |
| fraCaption_06.gif | 135 | Sep. 6, 2002 |
| fraCaption_07.gif | 934 | Sep. 6, 2002 |
| fraCaption_08.gif | 723 | Sep. 6, 2002 |
| fraCaption_09.gif | 981 | Sep. 6, 2002 |
| genFrame_01.gif | 296 | Oct. 8, 2002 |
| genFrame_02.gif | 187 | Oct. 8, 2002 |
| genFrame_03.gif | 307 | Oct. 8, 2002 |
| genFrame_04.gif | 253 | Oct. 8, 2002 |
| genFrame_05.gif | 128 | Oct. 8, 2002 |
| genFrame_06.gif | 249 | Oct. 8, 2002 |
| genFrame_07.gif | 212 | Oct. 8, 2002 |
| genFrame_08.gif | 211 | Oct. 8, 2002 |
| genFrame_09.gif | 264 | Oct. 8, 2002 |
| genFrame_10.gif | 264 | Oct. 8, 2002 |
| genFrame_11.gif | 299 | Oct. 8, 2002 |
| genFrame_12.gif | 187 | Oct. 8, 2002 |
| genFrame_13.gif | 294 | Oct. 8, 2002 |
| glow.gif | 2,279 | Oct. 8, 2002 |
| header_bg.jpg | 503 | Apr. 8, 2002 |
| hex0.gif | 85,109 | Oct. 8, 2002 |
| iconHelp.gif | 1,351 | Oct. 8, 2002 |
| img1.jpg | 8,709 | Oct. 8, 2002 |
| indent.gif | 93 | Oct. 8, 2002 |
| italic.gif | 83 | Oct. 8, 2002 |
| KingdomOil_logo.gif | 6,360 | Oct. 8, 2002 |
| KingdomOil_logo.jpg | 3,895 | Oct. 8, 2002 |
| kit.jpg | 7,442 | Oct. 8, 2002 |

-continued

| Title | Size in Bytes | Date of Creation |
|---|---|---|
| left.gif | 73 | Oct. 8, 2002 |
| magnify.gif | 325 | Oct. 8, 2002 |
| minus.gif | 336 | Oct. 8, 2002 |
| minus2.gif | 861 | Oct. 8, 2002 |
| NextPage.gif | 1,008 | Oct. 8, 2002 |
| node.gif | 344 | Oct. 8, 2002 |
| node2.gif | 838 | Oct. 8, 2002 |
| numberList.gif | 86 | Oct. 8, 2002 |
| outdent.gif | 93 | Oct. 8, 2002 |
| page_01.jpg | 434 | Oct. 8, 2002 |
| page_02.jpg | 412 | Oct. 8, 2002 |
| page_03.jpg | 1,053 | Oct. 8, 2002 |
| page_04.jpg | 429 | Oct. 8, 2002 |
| page_05.jpg | 419 | Oct. 8, 2002 |
| page_06.jpg | 2,231 | Oct. 8, 2002 |
| page_07.jpg | 424 | Oct. 8, 2002 |
| page_08.jpg | 503 | Oct. 8, 2002 |
| page_09.jpg | 489 | Oct. 8, 2002 |
| page_10.jpg | 531 | Oct. 8, 2002 |
| page_11.jpg | 2,077 | Oct. 8, 2002 |
| page_12.jpg | 455 | Oct. 8, 2002 |
| page_13.jpg | 494 | Oct. 8, 2002 |
| page_14.jpg | 4,863 | Oct. 8, 2002 |
| page_15.jpg | 618 | Oct. 8, 2002 |
| page_16.jpg | 570 | Oct. 8, 2002 |
| page_17.jpg | 1,889 | Oct. 8, 2002 |
| page_18.jpg | 1,651 | Oct. 8, 2002 |
| page_19.jpg | 582 | Oct. 8, 2002 |
| page_20.jpg | 587 | Oct. 8, 2002 |
| page_21.jpg | 561 | Oct. 8, 2002 |
| page_22.jpg | 633 | Oct. 8, 2002 |
| page_23.jpg | 2,861 | Oct. 8, 2002 |
| page_24.jpg | 528 | Oct. 8, 2002 |
| page_25.gif | 223 | Oct. 8, 2002 |
| page_25.jpg | 426 | Oct. 8, 2002 |
| photoframe.gif | 2,143 | Oct. 8, 2002 |
| photoframe-1x1.gif | 78 | Oct. 8, 2002 |
| photoframe-1x2.gif | 668 | Oct. 8, 2002 |
| photoframe-2x1.gif | 101 | Oct. 8, 2002 |
| photoframe-3x1.gif | 564 | Oct. 8, 2002 |
| plus.gif | 206 | Oct. 8, 2002 |
| plus2.gif | 866 | Oct. 8, 2002 |
| poweredby_unityworks1.gif | 2,470 | Oct. 8, 2002 |
| PreviousPage.gif | 1,005 | Oct. 8, 2002 |
| publishIcon.gif | 382 | Aug. 28, 2002 |
| publishIcon2.gif | 377 | Aug. 28, 2002 |
| right.gif | 73 | Oct. 8, 2002 |
| rt_arrow.gif | 864 | Oct. 8, 2002 |
| Shortcut to images.lnk | 598 | Mar. 18, 2002 |
| shortViewer_30.gif | 1,169 | Oct. 8, 2002 |
| shortViewer_30.jpg | 873 | Apr. 8, 2002 |
| shortViewer_31.gif | 1,468 | Oct. 8, 2002 |
| shortViewer_31.jpg | 796 | Apr. 8, 2002 |
| shortViewer_32.jpg | 813 | Oct. 8, 2002 |
| shortViewer_33.gif | 1,619 | Oct. 8, 2002 |
| shortViewer_33.jpg | 836 | Apr. 8, 2002 |
| shortViewer_34.gif | 2,844 | Oct. 8, 2002 |
| shortViewer_34.jpg | 1,428 | Apr. 8, 2002 |
| spacer.gif | 43 | Oct. 8, 2002 |
| tab_off.gif | 1,019 | Oct. 8, 2002 |
| tab_on.gif | 2,569 | Oct. 8, 2002 |
| thinFrame_01.gif | 279 | Aug. 23, 2002 |
| thinFrame_02.gif | 196 | Aug. 23, 2002 |
| thinFrame_03.gif | 279 | Aug. 23, 2002 |
| thinFrame_04.gif | 96 | Aug. 23, 2002 |
| thinFrame_05.gif | 1,206 | Aug. 23, 2002 |
| thinFrame_06.gif | 151 | Aug. 23, 2002 |
| thinFrame_07.gif | 122 | Aug. 23, 2002 |
| thinFrame_08.gif | 146 | Aug. 23, 2002 |
| thinFrame_09.gif | 146 | Aug. 23, 2002 |
| thinFrame_10.gif | 150 | Aug. 23, 2002 |
| thinFrame_11.gif | 278 | Aug. 23, 2002 |
| thinFrame_12.gif | 196 | Aug. 23, 2002 |
| thinFrame_13.gif | 278 | Aug. 23, 2002 |
| under.gif | 90 | Oct. 8, 2002 |
| underline.gif | 827 | Oct. 8, 2002 |
| UnityWorks_BG.gif | 31,786 | Oct. 8, 2002 |
| UnityWorks_logo.gif | 5,961 | Oct. 8, 2002 |
| welcome_01.jpg | 1,591 | Oct. 1, 2002 |
| welcome_02.jpg | 8,909 | Oct. 1, 2002 |
| welcome_03.jpg | 10,680 | Oct. 1, 2002 |
| welcome_04.gif | 2,618 | Oct. 1, 2002 |
| welcome_05.jpg | 4,609 | Oct. 1, 2002 |
| welcome_06.jpg | 2,380 | Oct. 1, 2002 |
| welcome_07.jpg | 6,059 | Oct. 1, 2002 |
| welcome_08.jpg | 8,503 | Oct. 1, 2002 |
| welcome_09.jpg | 959 | Oct. 1, 2002 |
| welcome_10.jpg | 3,977 | Oct. 1, 2002 |
| welcome_11.jpg | 4,513 | Oct. 1, 2002 |
| welcome_11-over.jpg | 4,179 | Oct. 1, 2002 |
| welcome_12.jpg | 935 | Oct. 1, 2002 |
| welcome_13.gif | 3,747 | Oct. 1, 2002 |
| welcome_14.jpg | 1,806 | Oct. 1, 2002 |
| welcome_15.jpg | 787 | Oct. 1, 2002 |
| welcome_16.gif | 3,487 | Oct. 1, 2002 |
| welcome_17.jpg | 584 | Oct. 1, 2002 |
| welcome_18.jpg | 420 | Oct. 1, 2002 |
| welcome_19.gif | 1,463 | Oct. 1, 2002 |
| welcome_20.gif | 2,574 | Oct. 1, 2002 |
| welcome_21.jpg | 473 | Oct. 1, 2002 |
| welcome_22.jpg | 470 | Oct. 1, 2002 |
| workZone.gif | 1,281 | Oct. 8, 2002 |
| workZone_enter.gif | 2,435 | Oct. 8, 2002 |
| workZone_enter2.gif | 2,138 | Oct. 8, 2002 |
| D:\UWSource\Website\images\members | | |
| 0 files; 0 bytes | | |
| D:\UWSource\Website\images\messages | | |
| 0 files; 0 bytes | | |
| D:\UWSource\Website\images\slides | | |
| 0 files; 0 bytes | | |
| D:\UWSource\Website\images\tabs | | |
| 0 files; 0 bytes | | |
| D:\UWSource\Website\images\template | | |
| 0 files; 0 bytes | | |
| D:\UWSource\Website\jscripts | | |
| contentScript.js | 4,380 | Oct. 8, 2002 |
| contentScript_old.js | 3,808 | Oct. 1, 2002 |
| contentScript2.js | 4,082 | Oct. 8, 2002 |
| vssver.scc | 48 | Oct. 8, 2002 |
| D:\UWSource\Website\messages | | |
| Thumbs.db | 84,480 | Jan. 25, 2002 |
| D:\UWSource\Website\treegen | | |
| genresize.js | 3,984 | Jun. 11, 2002 |
| TgToc.js | 17,186 | Jun. 11, 2002 |
| D:\UWSource\Website\treegen\images | | |
| back.gif | 828 | Jun. 11, 2002 |
| bullets.mic | 147,456 | Jun. 11, 2002 |
| demologo.gif | 3,410 | Jun. 11, 2002 |
| empty.gif | 135 | Jun. 11, 2002 |
| foldercol.gif | 1,021 | Jun. 11, 2002 |
| folderexp.gif | 1,022 | Jun. 11, 2002 |
| img.gif | 35 | Jun. 11, 2002 |
| imgminus.gif | 96 | Jun. 11, 2002 |
| imgplus.gif | 98 | Jun. 11, 2002 |
| item.gif | 926 | Jun. 11, 2002 |
| itemline.jpg | 972 | Jun. 11, 2002 |
| line1.gif | 846 | Jun. 11, 2002 |
| line2.gif | 852 | Jun. 11, 2002 |
| line3.gif | 846 | Jun. 11, 2002 |
| link.gif | 97 | Jun. 11, 2002 |
| minus.gif | 869 | Jun. 11, 2002 |
| minus1.gif | 878 | Jun. 11, 2002 |
| minus2.gif | 880 | Jun. 11, 2002 |
| plus.gif | 873 | Jun. 11, 2002 |
| plus1.gif | 878 | Jun. 11, 2002 |
| plus2.gif | 881 | Jun. 11, 2002 |
| triangle.gif | 1,218 | Jun. 11, 2002 |
| white.gif | 89 | Jun. 11, 2002 |

FIELD OF THE INVENTION

This invention relates to a process or apparatus for transferring data among a plurality of spatially distributed computers or digital data processing systems via one or more communications media. In particular, this invention relates to a system and method for asynchronous, networked, publication and collaborative communication from a secure website via the Internet.

BACKGROUND OF THE INVENTION

During the past fifty years, certain trends in our workforce have been continued with increased concern by many. First, as work skills have become more specialized and knowledge more important to worker performance, the workforce has by necessity become more mobile as workers often move great distances to accept the next job or position. Where once family, close friends, and colleagues were within walking distance, they now are often very spread out geographically. Second, the average number of hours per week that workers are working has increased so that workers often find it more and more difficult to maintain close connections with family, friends, and community. Third, as technology has been eliminating mundane, routine tasks from the workplace and dramatically decreasing the time required to complete other tasks, workers are working at a faster pace with less time to think about and make good decisions with a high degree of confidence. Finally, the focus of many successful companies is global, and these companies are controlling greater and greater amounts of human capital and other resources.

In recent years, the health profession has recognized these trends as leading towards higher job related stress and job dissatisfaction, as workers are having more difficulty balancing their job related demands with the demands and needs of their personal lives. In effect, the emotional and spiritual support network and feeling of belonging to or identity with a community that most workers once enjoyed is missing in many present day workers' lives. Often these workers are unaware of this until after an unmanageable personal problem or even a health crisis arises, or a tragedy or other disaster occurs in the community. This loss of community is what some religious groups might call an absence of fellowship. By staying in connection with one another and by coming together for one another when there is a need, a greater sense of security can be nurtured with its resulting health and productivity benefits. Moreover, by having corporate sponsorship for these kinds of activities, workers gain a greater appreciation for and increased commitment to the corporate sponsor in addition to a greater sense of personal fulfillment with respect to non-vocational or more spiritual aspects of their lives.

Although the Internet is a tool that allows people to work further apart from one another, it is also a tool that can bring people together when they are apart. The Internet has been an important network resource for people to obtain information and solicit help that is located at a distance or otherwise not conveniently located. For example, workers can get company data or advice located at another physical site or send someone an email correspondence to convey news or motivate participation and involvement. Technology has now advanced far enough so that users can talk to one another and transmit still pictures or video. Moreover, with the ever-increasing prevalence of the Internet, more and more people communicate via this medium.

The vast majority of communications over the Internet take the form of emails sent between individuals and individuals seeking news from websites. It is well known that emails also can be broadcast from one person to any number of recipients by including all of the necessary addresses in the email. Almost all email programs allow for groups of recipients to be identified by collecting a series of emails under a single group name such that the email program automatically includes all of the individual group addresses whenever the group name is used in the email address. While email has improved the ability for groups of people to stay in touch with one another, the logistics for organizing and communicating among larger groups is often cumbersome with conventional email programs. Employee portals are also very popular, as can be other company websites having end points of particular interest. The downfall of these is that the communication is usually top-down instead of bottom-up, as the employee portal is intended to fulfill needs of the company rather than non-vocational needs of the workers. In addition, because of the nature of competitive marketplaces, companies are cautious about enabling outside parties to publish non-company related content or otherwise communicate to others inside or outside the organization using the company's website and/or other resources.

Examples of web content publishing for workers and customers are employee portals and company website frameworks developed by Zope Corporation, employee portals developed by Workscape, and an illustration of an employee portal at contractsxml.org/c3pol/fianl/cr. Each of these, however, is intended to satisfy the business and/or human resources objectives of the sponsoring organization and is internally controlled and maintained. Access to content by someone outside the organization may be possible but publishing to the end points is generally not permitted. Two examples of patented networked community communication systems are Marks, U.S. Pat. No. 5,956,491, *Group Communications Multiplexing System*, and Yokobori et al., U.S. application Pub. No. 2001/0029501 A1, *Network Community Supporting Method and System*. Marks discloses a complex computer system and related software that allows for Internet based synchronous, multimedia communication without using an Internet service provider. Yokobori also discloses complex software, for analyzing group or community communications to better understand the characteristics, intentions, and needs of the members of the community for managing the community. Neither provides a simple system based on commonly available or commonplace Internet technology to publicize non-vocational activities into the work environment of the workers and thereby encourage workers to participate and keep the workers and their organizations interested and involved in these non-vocational activities.

It would be advantageous to have a simple Internet based system to publish non-vocational activities into work environments whereby organizations sponsor Internet website end points for workers to stay informed about non-vocational activities and communicate to others about such activities and events.

SUMMARY OF THE INVENTION

Asynchronous, networked publication and collaborative communication system and method comprise a secure website managed by one organization to which authorized members of a team can connect using an Internet browser program. News content is developed on the website using selected webpage templates, which news content is then published to pre-established end points sponsored by another organization and broadcast to selected persons. Alternatively the news content can be developed within the sponsoring organization when at least one authorized member is not affiliated with the sponsoring organization. Preferably, at least one is connected to a database to archive news content.

An asynchronous, networked publication and collaborative communication system is intended for use by people who may be spread out among several organization, geographically, or otherwise, but have a common non-vocational interest and need a communication tool to help bring themselves together as a functional team, group, or community, and to develop further interest and support for their cause. Communication is generally team member initiated and in the form of news content published to website end points or broadcast to email address holders via the Internet. End points may include a location on a company website, a location on an employee portal, or a location on a nonprofit organization website.

By moving non-vocational news content development outside of companies sponsoring the website end points, an environment arises in which this news content is more likely to shared among organizations. Preferred embodiments may include utilizing a publishing interface and toolkit on a website managed by an independent organization. Alternatively, preferred embodiments may allow a team member who is not affiliated with the sponsoring organization but rather another, preferably non-sponsoring and non-affiliated, organization to publish news content to a sponsoring company website location from an interface and toolkit at an unspecified location, including one within a sponsoring company.

The asynchronous, networked publication and collaborative communication system is related to the patent application entitled *Asynchronous, Leader Facilitated, Collaborative Networked Communication System*, filed on Oct. 15, 2002 and hereby incorporated herein in its entirety by reference. The inventions in this and the above named application can be used in conjunction with one another. As an example, if someone wants to broadcast news content to members of their team or group or community, this may be done by posting the news content as a member initiated message on a website location designated for use by the team, to begin a communication session among the team's members or as a reply message in an ongoing communication session.

A preferred embodiment of a system for member initiated, asynchronous publication and collaborative communication using the Internet comprises a team having a plurality of members from a plurality of organizations including at least one nonprofit organization; a news content website sponsored by at least one of the organizations, wherein the news content website is operatively connected to the Internet and has at least one end point dedicated to at least one non-vocational interest of the team; and a secure applications website operatively connected to the Internet and managed by a non-sponsoring and non-affiliated nonprofit organization, wherein the applications website has a publishing interface and toolkit including at least one pre-established link to the at least one news content website end point and at least one webpage template constructed and configured for use by team members to develop news content about the at least one non-vocational interest, wherein only selected team members have access to the applications website, and wherein the news content is selectively downloaded to the at least one news content website end point via the at least one pre-established link and selectively broadcast to selected team members. A relational database may be operatively connected to the interface and toolkit, whereby news content that is published or broadcasted is selectively saved in the database. For example, the database may be located at a preferred end point, such as when news content is automatically published to the end point or the end point is expressly or conspicuously listed among a selection of end points to which to publish.

An alternative preferred embodiment of a system for member initiated, asynchronous publication and collaborative communication using the Internet comprises a team having a plurality of members from a plurality of organizations, a website sponsored by at least one of the organizations, wherein the website is operatively connected to the Internet and has at least one end point dedicated to at least one non-vocational interest of the team, and a publishing interface and toolkit operatively connected to the Internet and having at least one pre-established link to the at least one website end point, wherein the interface and toolkit has at least one webpage template constructed and configured for use by at least one team member belonging to a non-sponsoring organization, to develop news content about the at least one non-vocational interest, and wherein the news content is selectively downloaded to the at least one website end point via the at least one pre-established link and selectively broadcast to selected team members.

In operation, a method for member initiated, asynchronous publication and collaborative communication among a team of members using the Internet comprises (a) forming a team having a plurality of members from a plurality of organizations; (b) providing a news content website sponsored by at least one of the organizations, wherein the news content website is operatively connected to the Internet and has at least one end point dedicated to at least one non-vocational interest of the team; (c) providing a secure applications program website managed by a non-sponsoring and non-affiliated nonprofit organization, and having a publishing interface and toolkit including at least one pre-established link to the at least one website end point and at least one webpage template constructed and configured for use by team members to develop news content about the at least one non-vocational interest; (d) providing access to the applications program website only to selected team members; (e) accessing the applications program website using an Internet browser software program; (f) developing news content about the at least one non-vocational interest on the at least one webpage template; (g) selectively downloading the news content selectively to the at least one news content website end point via the at least one pre-established link; and (h) selectively broadcasting the news content to selected team members.

The present invention has several advantages that permit both charitable organizations and corporations, for example, to each benefit from the collaborative communication and publication system. In the case of charitable organizations, the present inventions permits such organizations to seek out corporations or teams within corporations that may have an affinity for that organization and be able to provide assistance and/or resources to the benefit of the charitable organization. In the case of the corporations or other for-profit organizations, the present invention enables these entities to maximize on the opportunity for community branding by promoting involvement of their organization with recognized and/or local charitable organizations. The ability of the present invention to enable effective and efficient publication of news content throughout the system allows charitable organizations to better get their story out and permits corporations and similar for-profit entities to have a body of relevant news content about organizations they support ready for marketing delivery in a variety of Internet contexts such as web page links, e-mail notifications, web broadcasts or the like.

BRIEF DESCRIPTION OF THE DRAWINGS

FIG. 12 is an example of a production page of the system in FIG. 1 for an article having multiple pictures or slides.

FIG. 14A is an example of a drop down status menu of the system of FIG. 14.

FIG. 14B is an example of a drop down team pool menu of the system of FIG. 14.

DESCRIPTION OF THE PREFERRED EMBODIMENTS

The preferred embodiment relates to an asynchronous, networked publication and collaborative communication system in accordance with the present invention. The system is intended for use by people who may be spread out among several organizations, geographically, or otherwise but have a common non-vocational interest and need a communication tool to help bring themselves together as a functional team, group, or community and to develop further interest and support for their cause. Communication is generally team member initiated and in the form of news content published to website end points or broadcast to email address holders via the Internet. End points may include a location on a company website, a location on an employee portal, or a location on a nonprofit website. Because the preferred embodiment focuses on charitable or faith-based works, at least one of the organizations is a nonprofit organization.

The preferred embodiment comprises a team having a plurality of members from a plurality of organizations, a news content website, and a secure applications website. The news content website is sponsored by at least one of the organizations, which may be a for-profit business, a church, or another type of nonprofit organization. The website is operatively connected to the Internet and has at least one end point dedicated to a non-vocational interest of the team, often the primary interest for which the members have come together.

Figure 1:
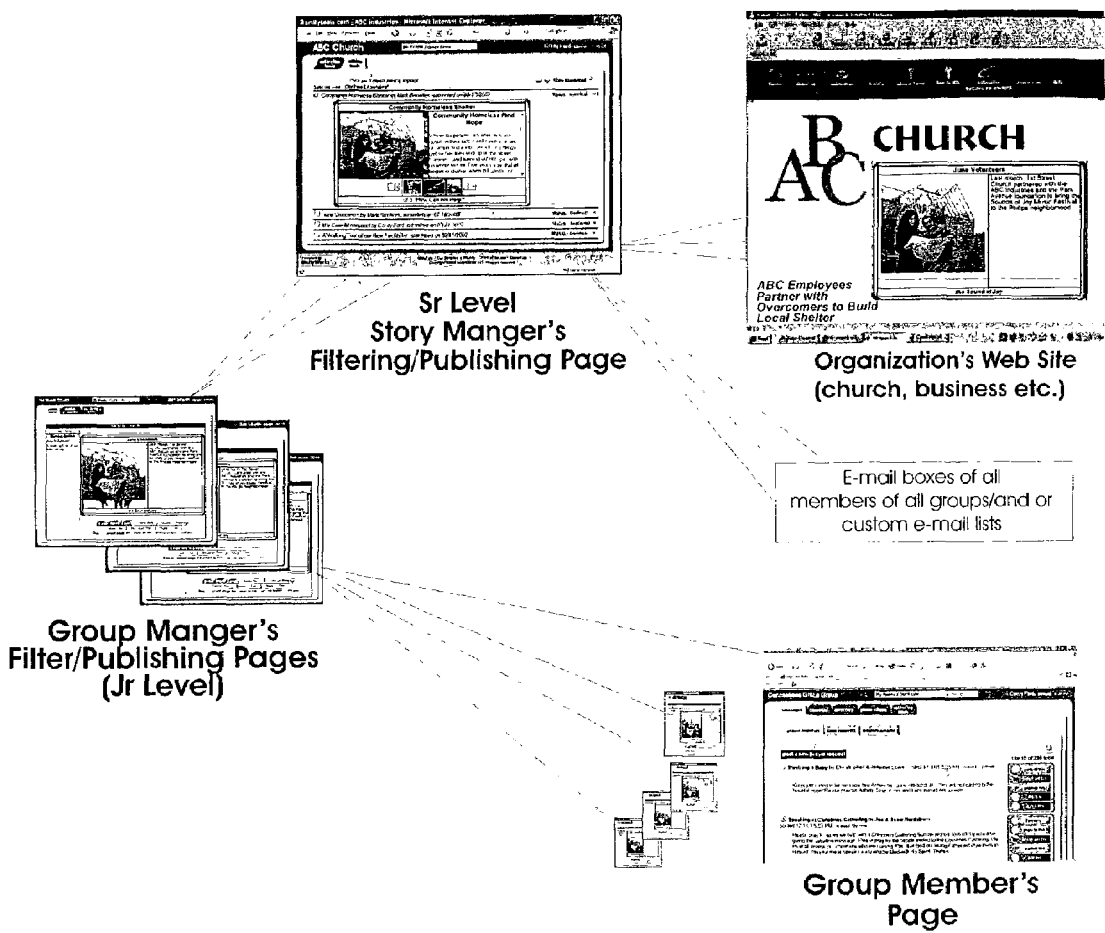
FIG. 1 is an overview of an asynchronous, networked publication and collaborative communication system in accordance with the present invention.

The applications website is also operatively connected to the Internet, and it is managed by a non-sponsoring and non-affiliated organization. In the context of the present invention, the term non-sponsoring is defined to mean that the managing organization is not a sponsor of the news content website, and the term non-affiliated is defined to mean that the managing organization is not controlled by a sponsoring organization of the news content website or a controlling owner of a sponsoring organization. FIG. 1 is an overview of these relationships.

Figure 2:
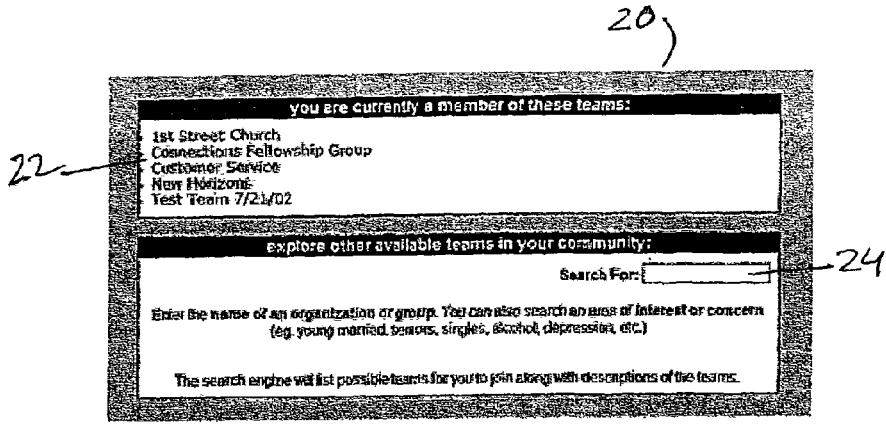
FIG. 2 is an example of the first page of the system in FIG. 1.

In operation, a member or other individual having authorized access to the applications website first connects via the Internet to the website's Internet address and then signs in using a standard Internet browser program. Preferably, the member must provide a proper, pre-arranged identifying characteristic, such as a password, answer to a question, or scan of a personal feature, to gain access to the applications website. As shown in FIG. 2, upon successfully signing in, a page 20 will appear to the member showing the member of which teams, groups, or communities he or she is a member 22 and which have locations on the applications website. The member is also given an option to search or explore for other teams 24 having locations on the applications website and that might interest the member, based on a name or team attribute. The result of the search is a list of teams that fit the search term along with a description of each team. The search option will not allow a member to enter the location of a team to which he or she does not belong.

Figure 3:
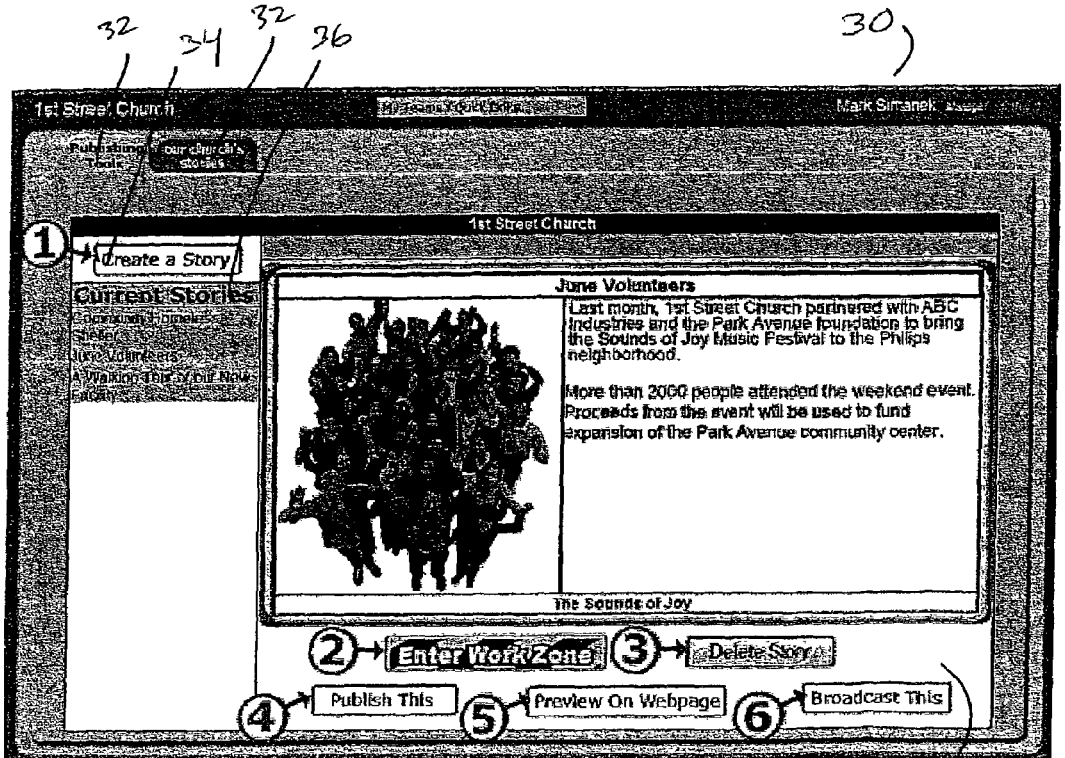
FIG. 3 is an example of the proof or story create page of the system in FIG. 1.

By choosing a team to which the member belongs, as shown in FIG. 3, the team page 30 will open and the member will see an interface with several tabs 32. These tabs provide options to the member for publishing news content, reading previously published news content, and the like. By clicking on the "Publishing Tools" tab, if it is not already the front tab on the page, the member will gain access to the publishing interface and toolkit. The front page of the interface, called the proof or story creation page, has a "Create a Story" button 34, a menu 36 for selecting to work on a story previously started, and five editing buttons 38. The "Enter Work Zone" button opens story editing tools for the news content or story selected, the "Delete Story" button deletes a selected story from the menu, the "Preview On Webpage" button shows the member what the news content will look like when it is published on a webpage, the "Publish This" button initiates a process to publish a story to selected pre-arranged end points, and the "Broadcast This" button initiates a process to broadcast a story to selected email addresses.

Figure 4:
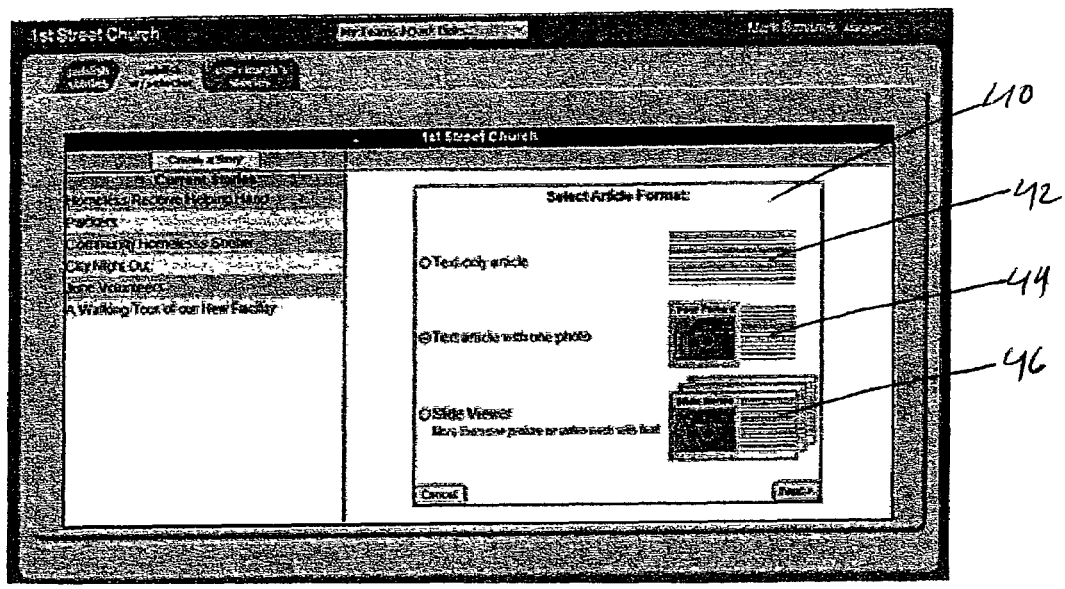
FIG. 4 is an example of the article format selection page of the system in FIG. 1.
Figure 13:
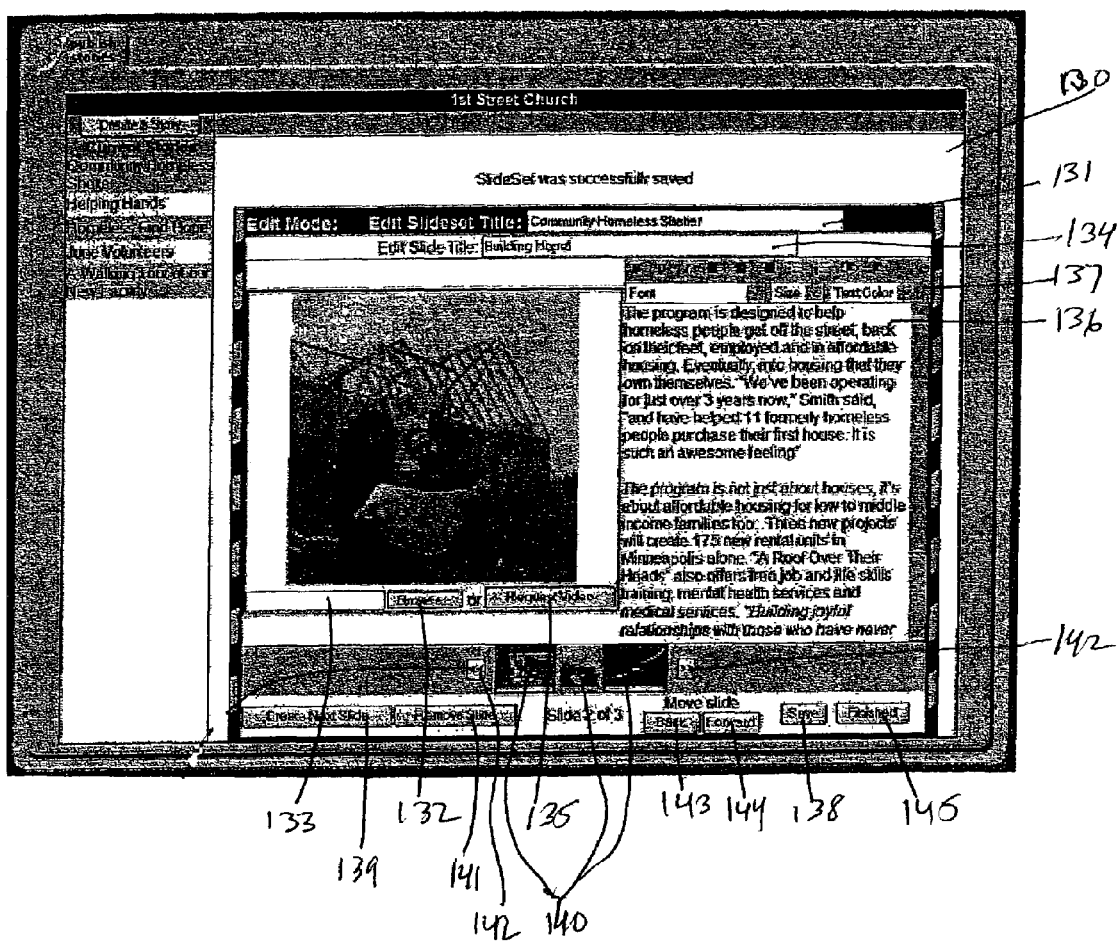
FIG. 13 is a second example of a production page of the system of FIG. 1 for an article having multiple pictures or slides.

If the member chooses to create a new story by selecting the "Create a Story" button, a "Select Article Format" window 40 appears as shown in FIG. 4, giving the member a choice of three formats or webpage templates, a text-only format 42, a text with photo format 44, and a slide viewer format 46. The text-only format 42 and text with photo format 44 are used for news content with and without a photograph, respectively. Alternatively, the formats could include presentations of audio, video, text, photographs, or any combination thereof. The slide viewer format 46 is used to create an interactive article with more than one page of text and photos or videos. The slide viewer format 46 is designed to allow a member to read an article much like a book, page by page. As shown in FIG. 13, a preferred feature of the slide viewer format 46 is that the slides and/or videos are simultaneously displayed in separate, side-by-side miniature window-in-windows, no matter where a reader is in the story. Users can page through the story by clicking on arrow buttons on either side of the windows or by clicking directly on a window.

Figure 5:
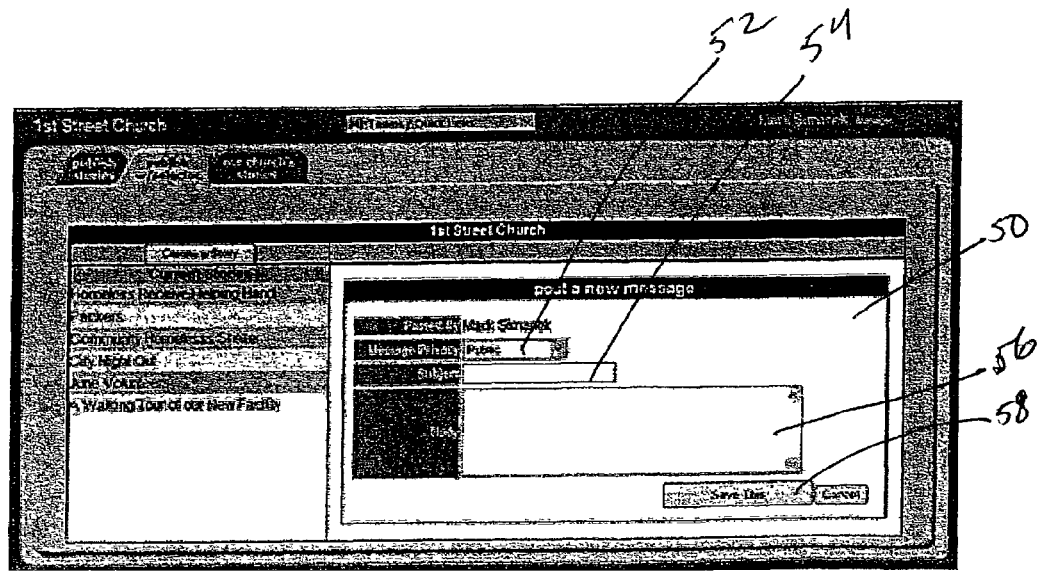
FIG. 5 is an example of the web page template of the system in FIG. 1 for a text only article.
Figure 6:
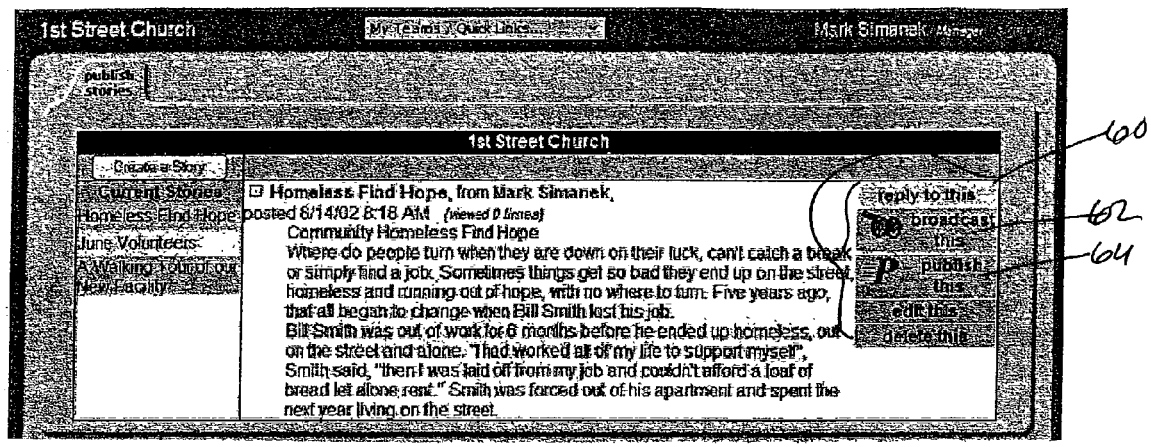
FIG. 6 is an example of a web page of the system in FIG. 1 including an article ready for publication or broadcast.

If the text-only format is selected, a "post a new message" window 50 appears as shown in FIG. 5. In this window are boxes for selecting the level of privacy 52 for a published article, a box to insert the subject matter of the news content or story 54, and a box to insert the body of the story 56. The story may be written directly into the story body box 56 or pasted from text written in any text editor, for example Microsoft Word™. The member then clicks on the "Save This" button 58 to prepare the article for publication and/or broadcasting and a publishing options menu 60 appears as shown in FIG. 6. There are two publishing options for text-only format: a story may be broadcast or emailed to groups and/or individuals by selecting the "broadcast this" button 62 and/or the story may be published to various pre-arranged website end points by selecting the "publish this" button 64.

Figure 7:
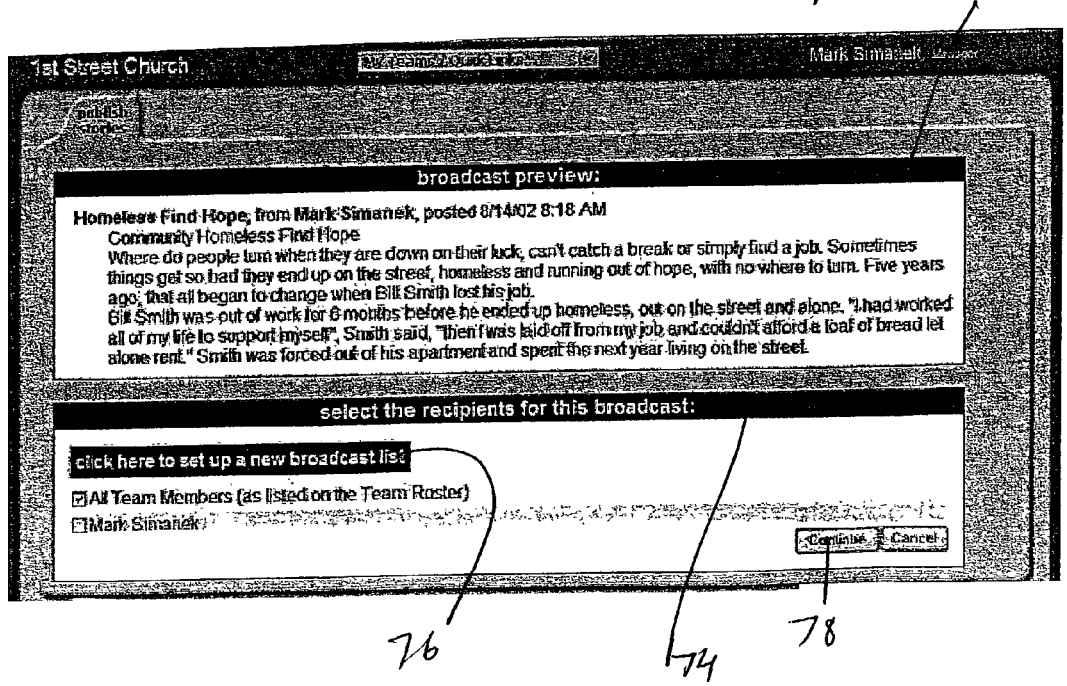
FIG. 7 is an example of a preview web page of the system in FIG. 1 for broadcasting an article.
Figure 8:
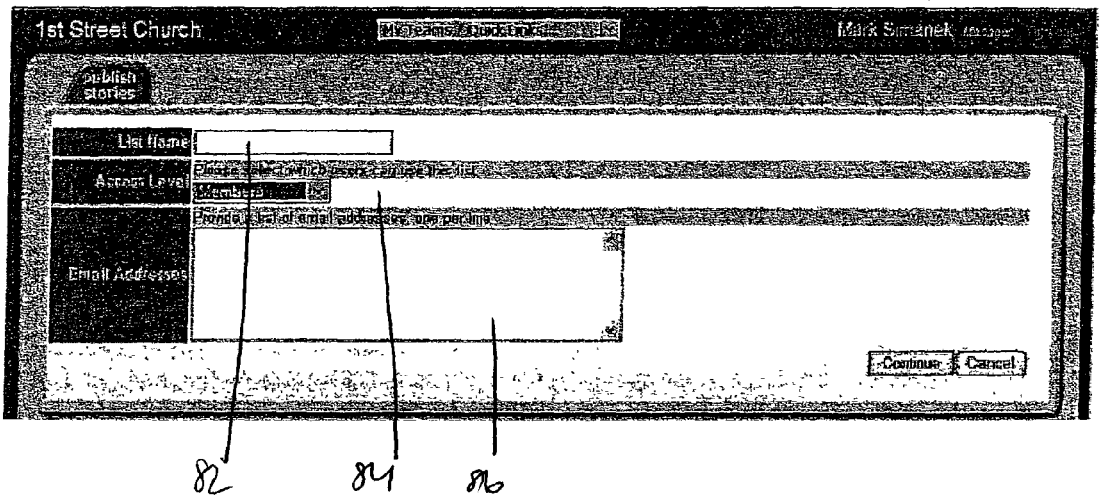
FIG. 8 is an example of an email list creation web page of the system in FIG. 1.
Figure 9:
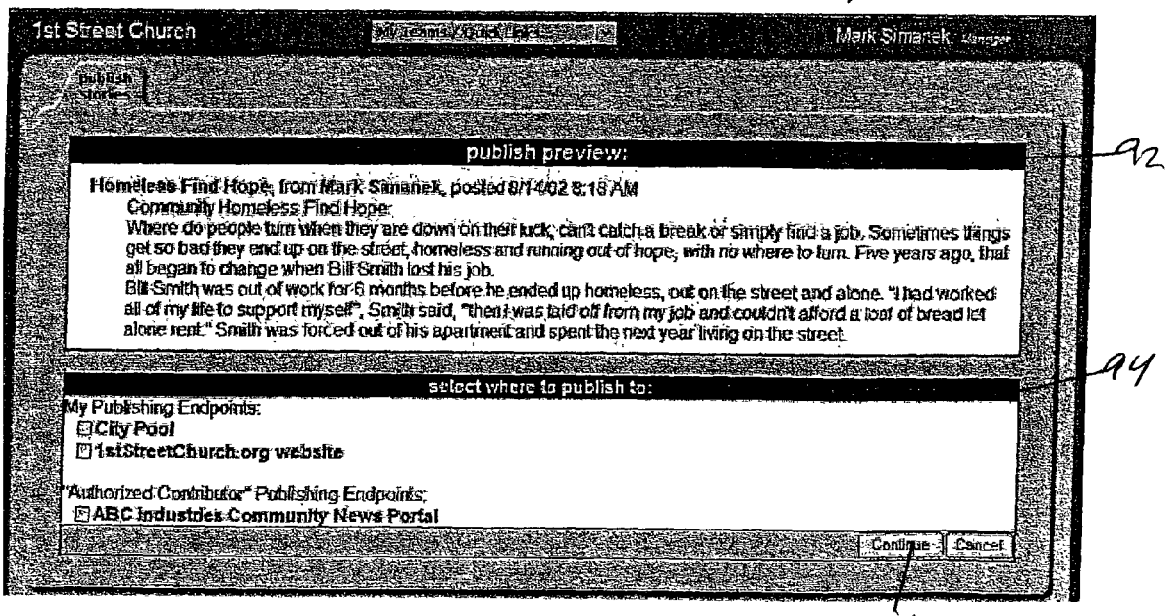
FIG. 9 is an example of a preview web page of the system in FIG. 1 for publishing an article.

As shown in FIGS. 7 through 9, when a story is being broadcast, a broadcast preview page 70 appears. This page includes a box that previews the story being broadcast 72 and a box for selecting the recipients for this broadcast 74. The box for selecting the recipients 74 has a master list of email groups and/or individuals. By clicking on the check box next to a name, that group or individual will be designated as a recipient and receive the email. Clicking on the "Continue" button 78 will instantly broadcast the news content to everyone selected. To add names to or delete names from the master list, the member clicks on the "click here to set up a new broadcast list" button 76, which brings up a list creator page 80. The member enters the group or list name in the "List Name" box 82 and the email addresses of the individuals in the group, one per line, in the "Email Addresses" box 86. An "Access Level" box 84 can also be used, to designate which users can use the list. Any number of recipient lists or groups can be created for groups of 1000 persons or less.

When a story is being published, by selecting the "publish this" button 64 on the publishing menu 60, a publish preview page 90 appears. This page too previews the story, this time in a "publish preview" box 92, and includes a box for selecting where to publish the story 94. This "select where to publish to" box 94 contains a list of publishing end points with links thereto, pre-established by the manager of the applications website specifically for the group or community and divided into two categories, "My Publishing Endpoints" and "Authorized Contributor Publishing Endpoints". "My Publishing Endpoints" includes a link to a database, such as City Pool in Minneapolis, Minn., for archiving stories from various groups or teams. This database is a significant development for uniting persons interested in charitable work and companies with human capital and other resources that are interested in helping. Because most communication tools are internally managed by a company, information about charitable activities and other non-vocational interests often is not shared. This database acts as a repository for submitted stories. The database can then be used for organizations having a connection pages to the database to browse for and post news content for their members to read and for charitable organization to find corporate partners. In addition, the database serves as a repository for the organization to use for community branding preferably in the form of Internet communications, such as web page links, e-mail notifications, adjuncts or links in unrelated e-mails that promote the news content or even web broadcasts. An authorized contributor is an author of an organization, often a ministry or charitable organization, that is authorized to publish news content to any company having a company connection page, so that their employees can connect to causes important to them. The company may have an editor that will approve all news content sent to the company connection page or to any other Internet communication channel before it is posted. Selecting whom to publish the news content to follows a process using check boxes next to names of end points similar to that for broadcasting. Clicking on the "Continue" button 96 will instantly publish the news content to everyone selected and a publishing confirmation page will appear, displaying the status of the story at each end point.

Figure 10:
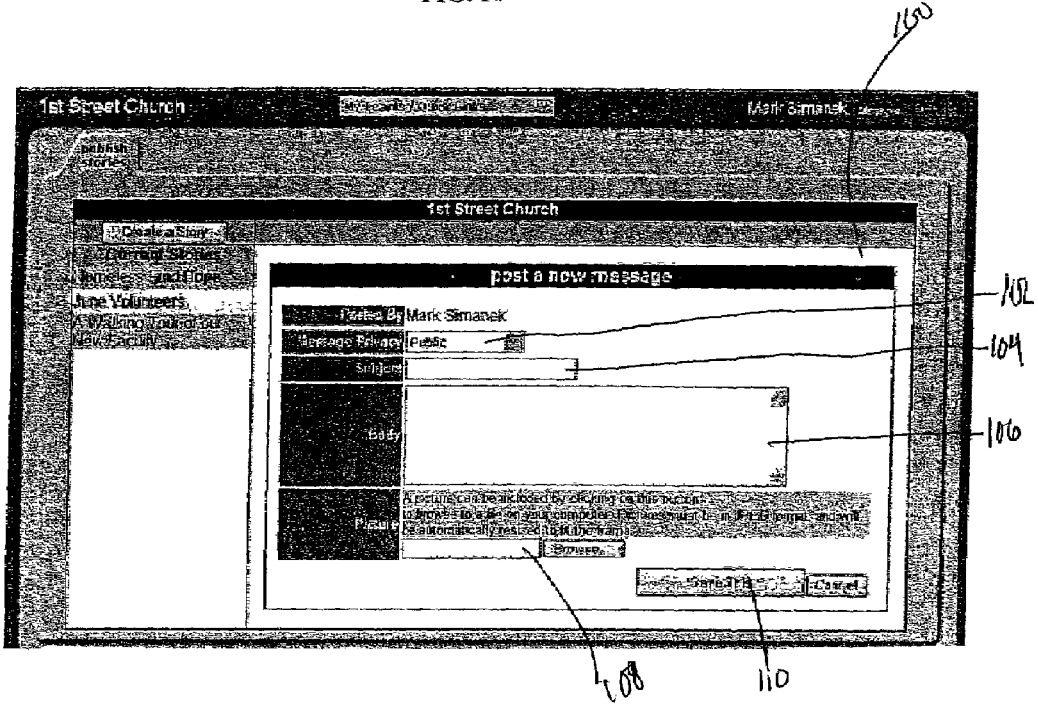
FIG. 10 is an example of the web page template of the system in FIG. 1 for an article including a picture.
Figure 11:
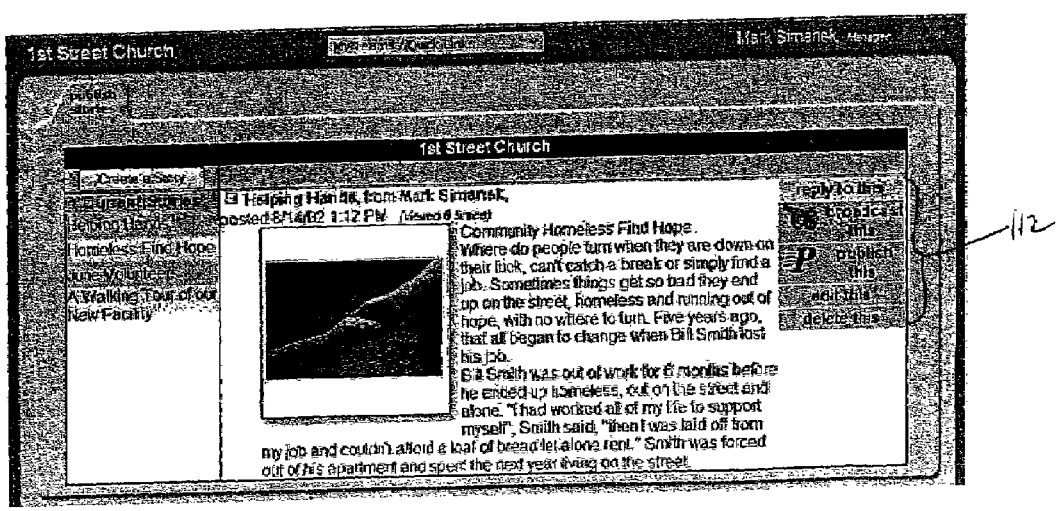
FIG. 11 is a second example of a web page of the system in FIG. 1 including an article ready for publication or broadcast.

As shown in FIGS. 10 and 11, when the text with photo format is selected, a "post a new message" window 100 appears similar to that for the text-only format, with the additional feature that a box appears in the window for accepting a photograph 108. The window 100 includes a "Message Privacy" box 102, a "Subject" box 104, a story body box 106, and the picture box 108. A photograph is incorporated into a story by browsing for the photo and clicking on the photo to create a path from the photo to the story window 100. Clicking on the "Save This" button 110 prepares the article for publication and/or broadcasting and a publishing options menu 112 appears. The process of publishing and/or broadcasting a story in text with photo format is similar to that for the text-only format.

As shown in FIGS. 12 and 13, when the slide viewer format is selected, a slide viewer production tool will open and a proof or slide viewer production window 120 will appear. The editing buttons 38 stay on the page when the slide viewer production window 120 appears. The editing buttons, once again, are "Enter Work Zone", "Delete Story", "Preview On Webpage", "Publish This", and "Broadcast This", having the same functions as described above.

To create a story in slide viewer format, the member may create a project folder on his or her computer, such as in Microsoft Word Tm Desktop or in My Documents and copy or paste all the pictures for the story into the folder. The headline or title of the story is entered in the "Edit Slideset Title" box 131 on the slide viewer production tool. This title does not change throughout the story and will appear in the Current Stories list after the story is saved. Next, the member clicks on the browse button 132 to browse the project folder for the first photo being inserted into the story. The path to the photo appears in the browse box 133. A video stream may be inserted into the story in place of a still photograph by clicking on the "Request Video" button 135 and submitting a video to the applications website manager for special processing. The caption or title of a slide, or video, is entered in the "Edit Slide Title" 134 box for each photo. The caption generally reflects what a corresponding photo is about or how it pertains to the story. The story body is entered in the story body box 136 as described above for the text-only and text with photo formats. Text formatting tools 137 such as bold, italics, font size, and color are available to edit the text for highlighting important information in the story. A page is completed by clicking on the "Save" button 138. Clicking on the "Create Next Slide" button 139 allows the member to repeat the above process for additional story pages and slides. Slides and story pages can also be removed by clicking on the "Remove Slide" button 141. As this process continues a series of side-by-side window-in-windows 140 appears, as described above. Viewers can page through a slide viewer formatted story by clicking on the arrow buttons 142 appearing on either side of the series or by clicking directly on any window in the series. The position of a story page and slide may be moved by clicking on the "Move Slide Back" button 143 or "Move Slide Forward" button 144. This feature is available only when there are two or more story pages and allows a page to be repositioned one position in the series per click. When the story is complete, the member clicks on the "Finished" button 145 to prepare the article for publication and/or broadcasting and a publishing options menu appears. The process of publishing and/or broadcasting a story in slide viewer format is similar to that for the other formats.

Figure 14:
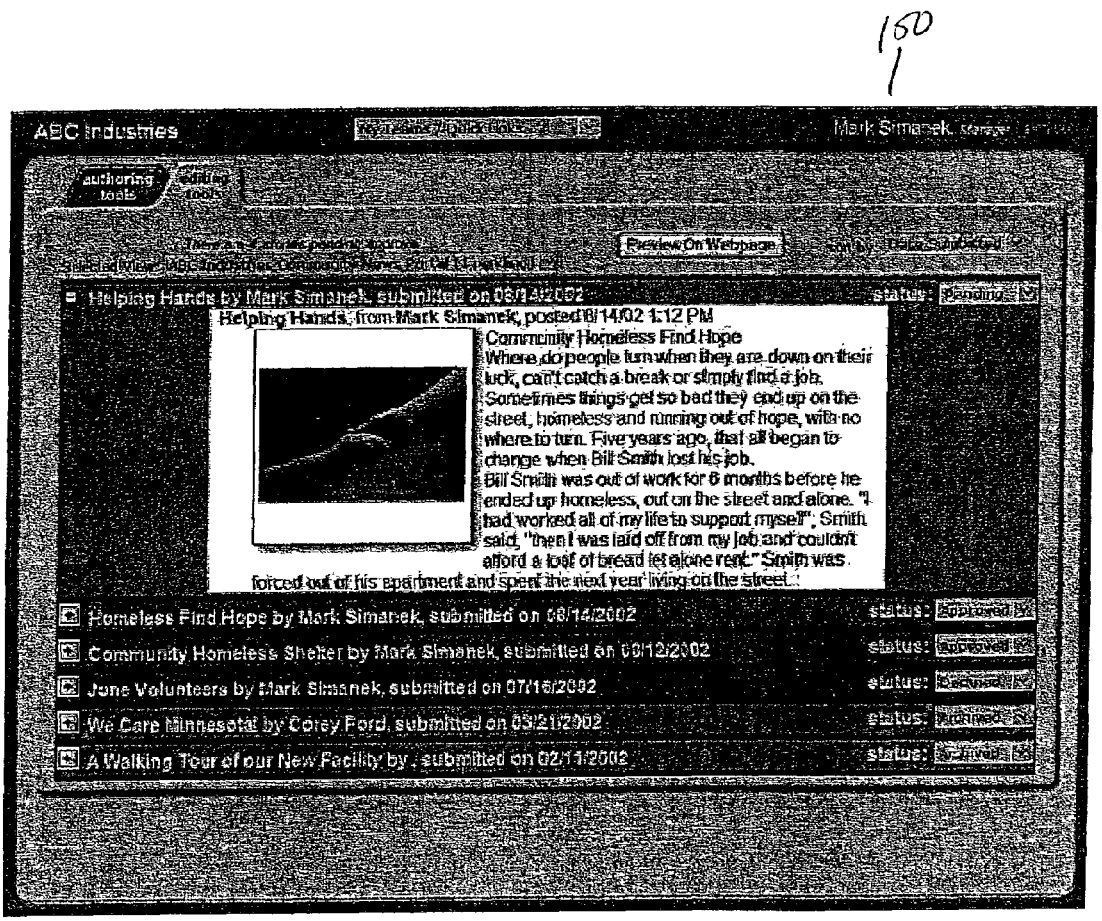
FIG. 14 is an example of an editing tool page of the system of FIG. 1 for use by a managing editor.

As shown in FIG. 14, the interface and toolkit offer additional editing tools 150 to groups or teams that have more than one author contributing stories to a website. The additional editing tools allow a managing editor to review content before it is posted to a website. When a story is published by an author, it is placed in an editing pool. An authorized manager/editor can review the pool of stories and approve for publication, decline for publication, or archive any story in the pool. Each story in the pool is color coded for quick reference. For example, yellow indicates a story that is pending, red a story that has been declined for publication, green a story that has been approved for publication, and gray a story that has been archived. Stories entering the pool and requesting publication are given yellow or pending status.

To change the status of a story, the editor clicks on the status bar of the story and a drop down status menu 152 for that story appears, as shown in FIG. 14A. The appropriate status for the story is then selected and the color of the color coding for the article changes to match the new status. If the story is approved, it is also posted or broadcast to the previously selected destinations. If the story is declined, the author is notified by email, and may be requested to make changes and resubmit the story. Archived stories stay in the pool and their status can be changed at any time.

Editors who need to edit stories from more than one pool, each pool corresponding to a group or team or community, can switch between pools using a "Selected View" drop down menu 154, as shown in FIG. 14B, and selecting the desired pool from among those pools listed. The "Selected View" menu 154 also indicates the number of stories pending approval in each pool.

Another feature of the system is that potential external authors (charities, etc.) can search for teams and/or companies (potential sponsors) and then find an organization or company that has a common interest and request to become an authorized contributing author. This then sets up filtering/editing by the company's editor. The editor then selects an end point, which could either be the company's website or one of the company's upsell libraries, e.g., sales persons, investor relation persons, and customer service persons libraries, etc. That filtered content is then made available to the world through either inclusion in e-mails, publishing to the company websites, etc.

For a more detailed understanding of the overall structure, architecture and operation of a preferred embodiment, persons of skill in the art are referred to the commented source code that is included with the application, the disclosure of which is hereby incorporated by reference.

The attachments and source code accompanying this application are copyrighted and no license or other relinquishment of copyrights in these materials is granted by virtue of the inclusion of these materials in this patent application, other than a limited license to copy these materials as part of the patent application process or as part of and for the limited purpose of obtaining a copy of the wrapper history.

Although the preferred embodiment of the asynchronous, networked publication and collaborative communication system has been described herein, it should be recognized that numerous changes and variations can be made and that the scope of the present invention is to be defined by the claims.

That which is claimed:

1. A system for member initiated, asynchronous publication and collaborative communication using the Internet, the system comprising:
   a team having a plurality of members from a plurality of organizations;
   a website sponsored by at least one of the organizations, wherein the website is operatively connected to the Internet and has at least one end point dedicated to at least one non-vocational interest of the team that facilitates collaborative communication among the plurality of the members of the team; and
   a publishing interface and toolkit operatively connected to the Internet and having at least one pre-established link to the at least one website end point, wherein the interface and toolkit has at least one webpage template constructed and configured for use by multiple members of the team belonging to a non-sponsoring organization, to develop news content about the at least one non-vocational interest that includes news content about events and others outside the team, and wherein the news content is developed remotely from the website and is selectively downloaded to the at least one website end point via the at least one pre-established link and selectively broadcast to email addresses of selected members of the team.

2. The system of claim 1, wherein the at least one end point is selected from a group of end points consisting of a location on a company website, a location on an employee portal, and a location on a nonprofit organization website.

3. The system of claim 1, further comprising a relational database operatively connected to the interface and toolkit, whereby news content that is published or broadcasted is selectively saved in the database.

4. The system of claim 1, wherein the news content has a format selected from a group of formats consisting of text-only, text with photo, video, audio, slide viewer, and any combination thereof.

5. The system of claim 4, wherein news content in slide viewer format includes at least one video stream.

6. The system of claim 4, wherein news content is in the slide viewer format and includes a plurality of slides and the slide viewer format simultaneously displays the slides in a series of side-by-side, window-in-window frames.

7. The system of claim 1, further including a managing editor tool which can be used by a managing editor other than a member that develops a news content to edit the news content before being published and broadcast and to selectively approve publication and broadcasting of selective news content.

8. The system of claim 1, wherein email addresses of selected members of the team are assembled under a group name to which to selectively broadcast news content.

9. The system of claim 1, wherein the publishing interface and toolkit are hosted by a nonprofit website separate from the website sponsored by at least one of the organizations, the nonprofit website being managed by a non-sponsoring and non-affiliated nonprofit organization.

10. A system for member initiated, asynchronous publication and collaborative communication using the Internet, the system comprising:
- a team having a plurality of members from a plurality of organizations including at least one nonprofit organization;
- a news content website sponsored by at least one of the organizations, wherein the news content website is operatively connected to the Internet and has at least one end point dedicated to at least one non-vocational interest of the team that facilitates collaborative communication among the plurality of the members of the team; and
- a secure applications website operatively connected to the Internet and managed by a non-affiliated nonprofit organization separate from the at least one of the organizations sponsoring the news content website, wherein the applications website has a publishing interface and toolkit including at least one pre-established link to the at least one news content website end point and at least one webpage template constructed and configured for use by members of the team to develop news content about the at least one non-vocational interest, wherein only selected members of the team have access to the applications website, and wherein the news content is selectively downloaded to the at least one news content website end point via the at least one pre-established link and selectively broadcast to email addresses of selected members of the team.

11. The system of claim 10, further comprising a relational database operatively connected to the interface and toolkit, whereby news content that is published or broadcasted is selectively saved in the database.

12. A system for member initiated, asynchronous publication and collaborative communication using the Internet, the system comprising:
- a team having a plurality of members from a plurality of organizations;
- a news content website sponsored by at least one of the organizations, wherein the news content website is operatively connected to the Internet and has at least one end point dedicated to at least one non-vocational interest of the team that facilitates collaborative communication among the plurality of the members of the team; and
- a secure applications website operatively connected to the Internet and managed by a non-affiliated organization other than the at least one of the organizations that sponsor the news content website, the secure applications website having
  - a publishing interface and toolkit including at least one pre-established link to the at least one news content end point and at least one webpage template constructed and configured for use by members of the team to develop news content about the at least one non-vocational interest that includes news content about events and others outside the team, wherein only selected members of the team have access to the applications website, and wherein the news content is selectively downloaded to the at least one news content website end point via the at least one pre-established link and selectively broadcast to email addresses of selected members of the team; and
  - a relational database operatively connected to the interface and toolkit, whereby news content that is published or broadcasted is selectively saved in the database.

13. A system for member initiated, asynchronous publication and collaborative communication using the Internet, the system comprising:
- a team having a plurality of members from a plurality of organizations;
- news content viewing means operatively connected to the Internet for viewing news content dedicated to at least one non-vocational interest of the team; and
- publishing means separate from the news content viewing mean for developing news content about the at least one non-vocational interest that includes news content about events and others outside the team, wherein the news content is selectively downloaded to the news content viewing means and selectively broadcast to email addresses of selected team members.

14. A method for member initiated, asynchronous publication and collaborative communication among a team of members using the Internet, the method comprising:
- (a) forming a team having a plurality of team members from a plurality of organizations;
- (b) providing a news content website sponsored by at least one of the organizations, wherein the news content website is operatively connected to the Internet and has at least one end point dedicated to at least one non-vocational interest of the team;
- (c) providing a secure applications program website managed by a non-affiliated nonprofit organization other than the at least one of the organizations that sponsor the news content website, and having a publishing interface and toolkit including at least one pre-established link to the at least one website end point and at least one webpage template constructed and configured for use by team members to develop news content about the at least one non-vocational interest that includes news content about events and others outside the team;
- (d) providing access to the applications program website only to selected team members;
- (e) accessing the applications program website using an Internet browser software program;
- (f) developing news content about the at least one non-vocational interest on the at least one webpage template;
- (g) selectively downloading the news content to the at least one news content website end point via the at least one pre-established link; and
- (h) selectively broadcasting the news content to email addresses of selected team members.

15. The method of claim 14, wherein the step of developing news content includes creating a new story and working on a story previously started.

16. The method of claim 14, wherein the step of developing news content includes selecting a format from a group of formats consisting of text-only, text with photo, video, audio, slide viewer, and any combination thereof.

17. The method of claim 16, wherein news content in slide viewer format includes at least one video stream.

18. The method of claim 14, wherein the at least one end point is selected from a group of end points consisting of a location on a company website, a location on an employee portal, and a location on a nonprofit organization website.

19. The method of claim 18, wherein the nonprofit website location is operatively connected to a database to archive the news content downloaded thereon.

20. The method of claim 14, wherein a team member is from an unaffiliated nonprofit organization, an end point is a location on a company website, and the team member is authorized to publish to the end point on the company website.

21. The method of claim 14, wherein a team member is from an unaffiliated nonprofit organization, an end point is a location on an employee portal, and the member is authorized to publish to the end point on the employee portal.

22. The method of claim 14, further including the step of using a managing editor tool to enable a managing editor other than a team member who developed a news content to edit the news content before being published and broadcast and to selectively approve publication and broadcasting of news content.

23. The method of claim 14, wherein email addresses of selected team members are assembled under a group name to which to selectively broadcast news content.

24. The method of claim 14, wherein a team member can search the applications website for a team using a name or team attribute.

25. A system for member initiated, asynchronous publication and collaborative communication using the Internet, the system comprising:
a team having a plurality of members from a plurality of organizations;
a website sponsored by at least one of the organizations, wherein the website is operatively connected to the Internet and has at least one end point that facilitates collaborative communication among the plurality of the members of the team; and
a publishing interface and toolkit operatively connected to the Internet and having at least one pre-established link to the at least one website end point, wherein the interface and toolkit has at least one webpage template constructed and configured for use by multiple members of the team belonging to a non-sponsoring organization, to develop news content that includes news content about events and others outside the team, and wherein the news content is developed remotely from the website and is selectively downloaded to the at least one website end point via the at least one pre-established link and selectively broadcast to email addresses of selected members of the team team.

26. The system of claim 25, further comprising a relational database operatively connected to the interface and toolkit, whereby news content that is published or broadcasted is selectively saved in the database.

27. The system of claim 25, wherein the news content has a slide viewer format and includes a plurality of slides and the slide viewer format simultaneously displays the slides in a series of side-by-side, window-in-window frames.

28. The system of claim 25, further including a managing editor tool which can be used by a managing editor other than a member that develops a news content to edit the news content before being published and broadcast and to selectively approve publication and broadcasting of selective news content.

* * * * *